March 9, 1937.  H. A. DOUGLAS  2,072,869
SIGNALING SYSTEM
Filed Jan. 18, 1933  2 Sheets-Sheet 1

Inventor
Harry A. Douglas
By Langdon Moore
Atty.

March 9, 1937.  H. A. DOUGLAS  2,072,869
SIGNALING SYSTEM
Filed Jan. 18, 1933   2 Sheets-Sheet 2
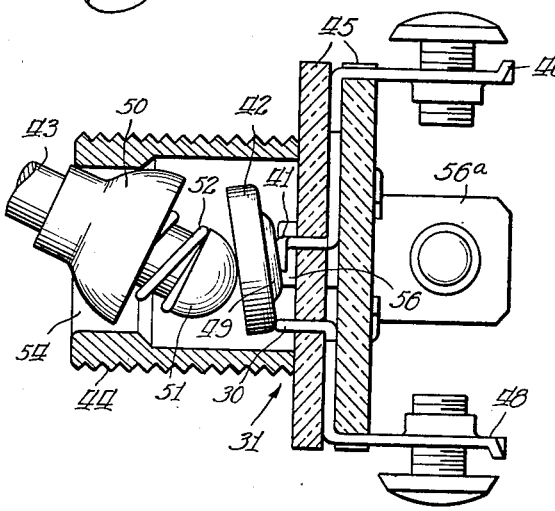
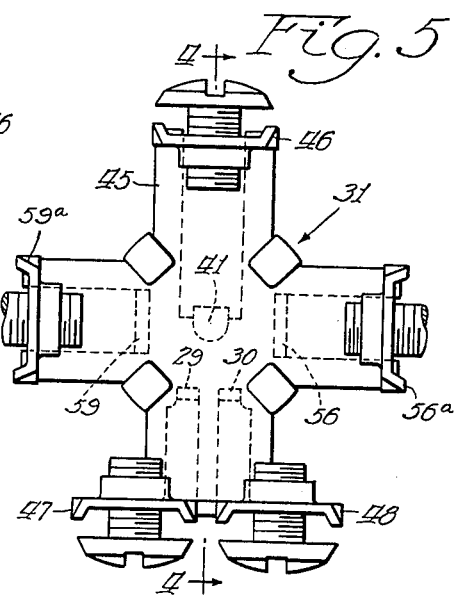
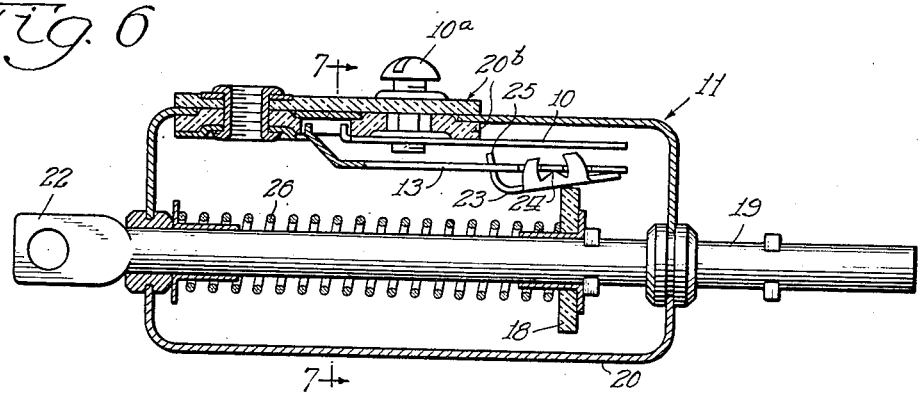
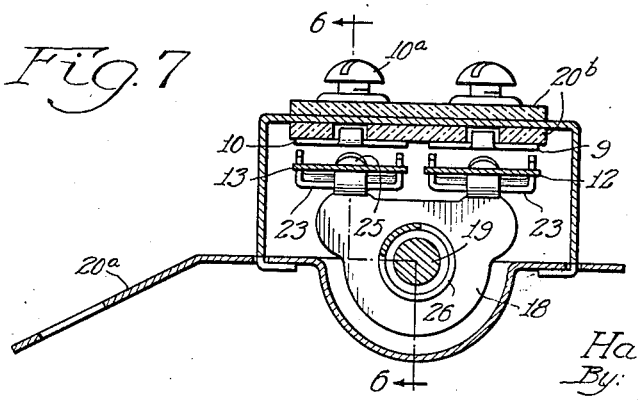
Inventor
Harry A. Douglas
By: Langdon Moore Patented Mar. 9, 1937

2,072,869

UNITED STATES PATENT OFFICE 2,072,869

SIGNALING SYSTEM

Harry A. Douglas, Bronson, Mich.

Application January 18, 1933, Serial No. 652,289

6 Claims. (Cl. 177—337)

This invention relates to signaling systems for automotive vehicles and more particularly to a combined direction and stop signal system.

Among other objects, the invention aims to provide simple and efficient means by which the operator of the vehicle may indicate to the occupants of another car in the rear when he intends to make a right or left hand turn, and a further important object of the invention is to provide automatic means controlled by the setting of the braking mechanism of the vehicle for actuating both the right and left hand signals simultaneously to indicate a stop signal.

The invention is desirably inclusive of a telltale signal connected with each of the right and left hand signals and visible to the operator to indicate when one or both of the right and left hand signals are actuated.

Other objects and advantages will be apparent from the following description, taken together with the accompanying drawings, showing an illustrative embodiment of the invention.

In the drawings

Figure 4 is a detail sectional view of the operator controlled switch included in my invention and being a section taken on the line 4—4 of Figure 5;

Figure 5 is an end view of the structure of Figure 4;

Figure 6 is a detail sectional view of the switching mechanism controlled by the braking mechanism of the vehicle and being a section taken on the line 6—6 of Figure 7; and Figure 7 is a cross-section taken on the line 7—7 of Figure 6.

Figure 1:
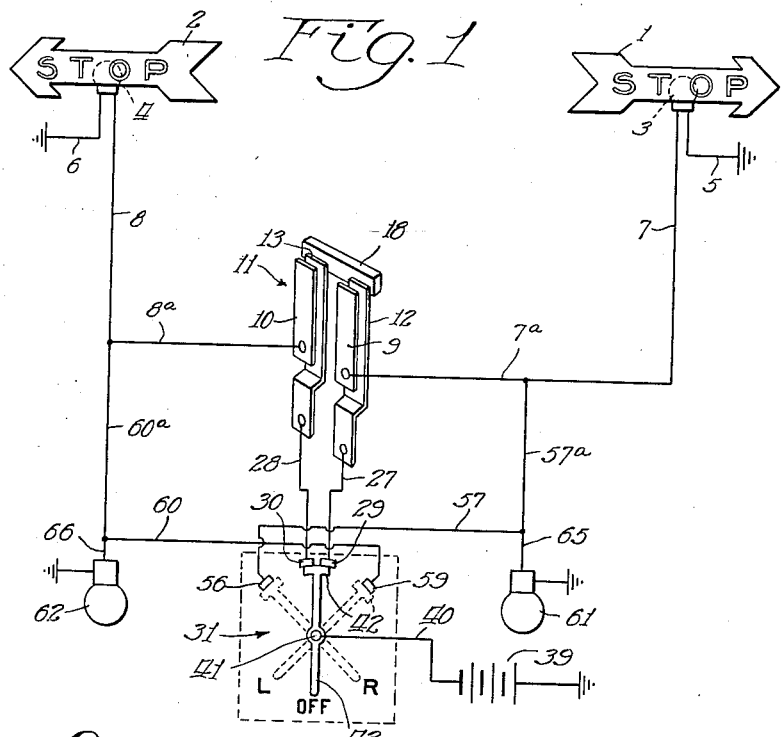
Figure 1 is a diagrammatic view of a signaling system embodying my invention.

In the illustrative hook-up, the arrows 1 and 2, respectively, indicate oppositely directed right and left hand arrows or pointers of translucent material, such as red glass, carried upon the rear of the vehicle, at opposite sides thereof, by any suitable mounting means not necessary to be here described. These arrows point outwardly of the vehicle to the right and left respectively, and when either of them is illuminated an obvious signal is given to the occupants of another car in the rear of the vehicle in question, for example, that the vehicle is about to make a right or left turn, depending upon whether the right or left hand arrow of the vehicle is illuminated. The arrows being desirably widely separated are not likely to be confused with the ordinary stop signal. When both arrows are illuminated, an obvious signal is conveyed to said other car that the vehicle in question is about to stop. If desired, the word "Stop" may be imprinted upon each of the arrows, since if only one of the arrows is illuminated, even though it bears the word "Stop", the direction in which the arrow points obviously indicates that the vehicle is about to turn in that direction and the addition of the word "Stop" to the signal does not detract from the definiteness of the signal indicated by the direction in which the arrow points, but, on the contrary, desirably conveys an added cautionary signal.

The arrows 1 and 2 may be illuminated respectively by the incandescent lamps 3 and 4 located behind the arrows, one upon the same mounting which carries each arrow. The lamps 3 and 4 may be grounded to the metallic frame of the vehicle by conductors 5 and 6, respectively, and may be connected by insulated conductors 7, 7a and 8, 8a, respectively, with the fixed contacts 9 and 10, respectively, of a switching mechanism 11, automatically controlled by the braking mechanism of the vehicle.

Figures 1A, 3A:
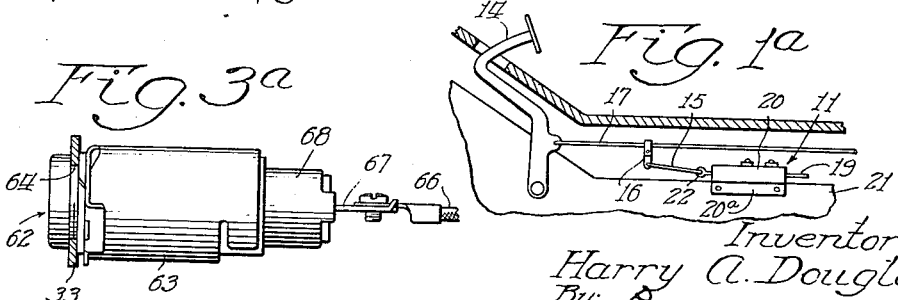
Figure 1a is a fragmentary view, somewhat diagrammatic, showing a portion of the braking mechanism of the vehicle and associated mechanism included in my invention.
Figure 3a is a section taken on the line 3a—3a of Figure 2.

The switching mechanism 11 contains a pair of movable contacts 12 and 13, engageable, respectively, with the contacts 9 and 10. The switching mechanism 11 is controlled by the brake pedal 14, for example, as shown in Figure 1a, by being connected by a flexible link 15 with a clip 16 clamped to the brake rod 17. As here shown, the movable contacts 12 and 13 are both moved by a single insulating actuator 18 in the form of a fiber body mounted on a switch rod 19 to reciprocate with the rod in the switch casing 20 which may be rigidly attached to the transmission housing 21, for example, of the vehicle, the switch rod 19 extending through the casing and being articulated, as by a clevis 22 formed at one end thereof, with the link 15. The casing 21 may be mounted on its selected support such as the housing 21 by a bracket extension 20a formed integrally with the casing.

In the switching mechanism 11, in this instance (see Figures 6 and 7) the fixed contacts 9 and 10 are arranged parallel and abreast and the movable contacts 12 and 13 are arranged parallel and abreast and respectively opposite the contacts 9 and 10. All of these contacts are desirably in the form of resilient bars, which are mounted in the casing 20 through the intermediation of insulating blocks 20b carried in the wall of the casing. The bars 9 and 10 are connected by means of the usual binding screws such as the screw 10a with the conductors 7a and 8a, respectively. Similarly the bars 12 and 13, which are offset in the casing to overlie, but to be slightly spaced from, the bars 9 and 10, are connected with the conductors 27 and 28, respectively.

The movable contacts 12 and 13 may each include a pivoted plate 23 fulcrumed on the contact 12 or 13, as the case may be, on a knife-edge fulcrum 24. Each plate 23 is held to its fulcrum by the insulating actuator 18 which engages both plates 23 simultaneously and which when moved across the fulcrum 24 tilts the plates into or out of engagement with the contacts 9 and 10 simultaneously, the plates 23 each having a finger 25 turned transversely and directed toward the contacts 9 and 10, respectively. The contact bars may be perforated to permit the fingers 25 to move freely therethrough. All of these contact bars, being desirably flexible and resilient, automatically adjust themselves to slight variations in dimensions or pressure, and no nice fit of these parts of the switching mechanism 11 is required.

As shown in Figures 1a, 6 and 7, the brake mechanism is in released position and the switching mechanism 11 is in "off" position. When the brake pedal 14 is pressed upon to set the braking mechanism, the actuator 18 is moved across the fulcrums 24 against the force of a coil spring 26 disposed about the switch rod 19 between the end wall of the casing 20 and the actuator 18, thus causing the contacts 12 and 13, through the intermediation of their finger portions 25, to be moved to engage the contacts 9 and 10, respectively, and placing the switching mechanism in "on" position with respect to both of the lamps 3 and 4. When the braking mechanism is again released, the spring 26 moves the actuator 18 across the fulcrums 24 in the opposite direction and places the switching mechanism 11 again in "off" position with respect to the lamps 3 and 4. The switching mechanism 11 is more specifically described and claimed in my copending application, Serial No. 621,152, filed July 7, 1932, Patent Number 1,941,252, December 26, 1933.

Figures 2, 3:
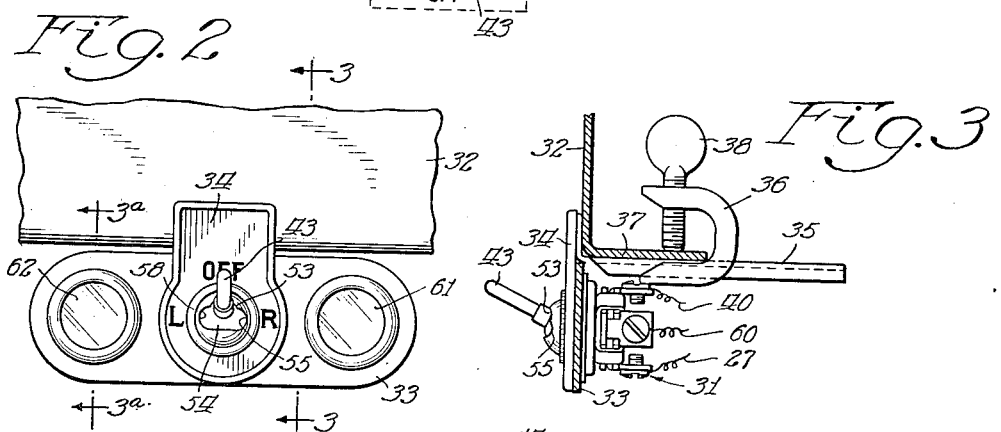
Figure 2 is a fragmentary view of the instrument panel of the vehicle carrying a mounting bracket.
Figure 3 is a section taken on the line 3—3 of Figure 2.

Referring again to Figure 1, each of the movable contacts 12 and 13 of the switching mechanism 11 is connected by insulated conductors 27 and 28, respectively, with central fixed contacts 29 and 30, respectively, of a second switching mechanism 31 conveniently mounted on the instrument panel 32 of the vehicle. As shown in Figures 2 and 3, the switching mechanism 31 may be mounted on a bracket 33 which is attached, by means of the switching mechanism itself, to another angular bracket having a vertical leg 34 forming a legend plate for the switching mechanism and another leg 35 which is passed through a slotted U-frame 36 and clamped to a horizontal portion 37 of the instrument panel 32 by means of a clamping screw 38. This mounting means just referred to is more specifically described and claimed in my copending application, Serial No. 637,720, filed October 14, 1932, Patent Number 1,946,967, February 13, 1934.

A source of electric current such as the grounded battery 39 is connected by the insulated conductor 40 permanently with a fixed contact 41 in the switching mechanism 31, and a movable contact 42 in said switching mechanism is in continuous engagement with the fixed contact 41, being movable thereabout to engage the other fixed contacts carried by the switching mechanism, under the actuation of an operator controlled member, such as the hand lever 43.

As shown in Figures 4 and 5, the switching mechanism 31 may comprise a cup-shaped metallic casing 44 closed at one end by a pair of insulating discs 45, 45 to which are secured, as by being clamped therebetween, the fixed contacts of the switching mechanism with their terminal continuations. The contact 41 has a terminal continuation 46 to which by means of the usual binding screw is connected the conductor 40 from the battery 39. Similarly, the contacts 29 and 30 by their terminal continuations 47, 48, respectively, are connected respectively with the conductors 27 and 28. The movable contact 42 is shown in the form of a metal-faced disc having a centrally recessed portion 49 which swivels on the fixed contact 41 as by a ball and socket engagement, and is tiltable to have its metal face engage the contacts 29 and 30 simultaneously, these contacts being placed sufficiently close together for this purpose. To tilt the disc 42 the hand lever 43 may be slightly reciprocable in a spherical bearing member 50 having an annular bearing. The head 51 of the operating lever 43 is held in yieldable resilient abutment with the disc 42 by a coil spring 52 surrounding the lever 43 and pressing at one end against the head 51 and at its other end against the bearing member 50, thus yieldably retaining the movable contact 42 in its selective positions. Suitable means is provided for insulating the lever 43 from the metal face of the disc 42. For example, the face of the disc against which the head 51 bears may be provided with an insulating insert (not shown).

The structure shown in Figures 4 and 5 is claimed in my co-pending application, Serial No. 568,668, filed October 14, 1931, Patent Number 1,912,623, June 6, 1933, and Serial No. 622,206, filed July 13, 1932, Patent Number 1,912,624, June 6, 1933.

When the handle 43 is in the position shown in Figures 2, 3 and 4, it is received in a notch 53 in a side of the opening 54 in the end of the casing 44 through which the lever 43 extends. This notch 53 is marked "Off" to indicate that this is the neutral position of the switching mechanism 31 in which the movable contacts 12 and 13 of the switching mechanism 11 are each in electrical communication with the battery 39. When the switching mechanism 31 is in this normal position and the brake pedal 14 is pressed upon, the movable contacts 12 and 13 of the switching mechanism 11 are moved to engage the fixed contacts 9 and 10 thereof and the lamps 3 and 4 are both energized, illuminating both arrows 1 and 2 and indicating a stop signal.

When the operator wishes to signal that he is going to turn to the right, he manually moves the lever 43 out of the notch 53 and into the notch 55 marked "R" for "right", whereupon the movable contact 42 is tilted out of engagement with the fixed contacts 29 and 30 and into engagement with another fixed contact 56 carried by the switching mechanism 31. The fixed contact 56 through its terminal extension 56a is connected by insulated conductors 57, 57a with the conductor 7 and is thus directly in series with the right hand lamp 3. Thus when the lever 43 is in the notch 55, the switching mechanism 11 is shunted out of circuit and regardless of whether or not this switching mechanism is actuated by the brake setting mechanism, as described, only the right hand arrow 1 will be illuminated. Thus the signal is given that the operator intends to turn in the direction in which this arrow points, i. e., to the right.

Similarly, when the operator wishes to signal that he intends to turn to the left, he may move the lever 43 into the notch 58 marked "L" for "left". When the lever 43 is in this position the movable contact 42 of the switching mechanism 31 is tilted on the contact 41 to engage the fixed contact 59 of the switching mechanism 31. The fixed contact 59 through its terminal extension 59a is connected by means of the insulated conductors 60, 60a with the conductor 8. Thus when the lever is in this position the switching mechanism 11 is again shunted out of circuit and only the lamp 4 is energized illuminating only the arrow 2 and indicating that the vehicle is about to turn in the direction in which this arrow points i. e. toward the left. After he has made the turn, the operator moves the lever 43 back to "off" or neutral position again placing the switching mechanism 11 in series with the battery 39 and each of the lamps 3 and 4, so that both lamps will be energized upon actuation of the switching mechanism 11. The switching mechanism 11 desirably has no ordinary "off" position.

I may advantageously provide the tell-tale lamps 61 and 62 in parallel, respectively, with the lamps 3 and 4 and mounted on the bracket 33 opposite the notches 55 and 58, respectively, so that when one or both of the lamps 3 and 4 are energized, by actuation of either the switching mechanism 11 or switching mechanism 31, one or both of the lamps 61 and 62 will be energized as the case may be. If, for example, the tell-tale lamp 61 is glowing continuously the attention of the driver is called to the fact that the signaling system is set to indicate that he is about to make a right hand turn. After he has made the turn, the glowing of the lamp 61 reminds the operator that he should move the lever 43 back to neutral or "off" position. When the lever 43 is in neutral position, both tell-tale lamps 61 and 62 will be illuminated only when the braking mechanism is set, which indicates to the operator that the system is in correct position for indicating a stop signal.

Each of the lamps 61 and 62 may be carried on the bracket 33 through the intermediation of a housing 63 (Fig. 3a) carried upon the rear of the bracket, and the bracket being apertured as at 64 to permit the lamps to be seen therethrough. If desired, the apertures 64 may be closed by a colored translucent material such as red or green glass.

The lamp 61 may be conveniently connected by means of the insulated conductor 65 with the conductor 57a and the lamp 62 similarly by means of the conductor 66 with the conductor 60a, the other terminal of the lamp being grounded. The conductors 65 and 66 may each be secured to a terminal 67 carried by a socket 68 which is received in the housing 63 together with the lamp 61 or 62 as the case may be. The construction shown in Figure 3a is more specifically described and claimed in my co-pending application, Serial No. 644,282, filed November 25, 1932 (Case 357).

So constructed and arranged I have shown a combined direction and stop signal system which has the advantage of simplicity and economy, while at the same time being positive in operation. Obviously, the invention is not limited to details of construction shown for purposes of illustration.

Having described my invention, I claim:

1. A combined direction and stop signal system for automotive vehicles, comprising: a pair of electroresponsive direction signal devices indicating opposite directions of travel when energized; selector switch means having several operative positions; said selector switch means having two relatively stationary contacts in one of said positions, and having a relatively movable contact simultaneously engageable with both of said relatively stationary contacts; independent electrical connections between said two relatively stationary contacts and said direction signal devices respectively; auxiliary switch means having open and closed positions; said auxiliary switch means being interposed in said independent connections; said selector switch means having relatively stationary contacts in each of a second and third position; and electrical connections between said second and third position relatively stationary contacts and said direction signal devices respectively, by-passing said auxiliary switch means.

2. A combined direction and stop signal system for automotive vehicles, comprising: a pair of electroresponsive direction signal devices indicating opposite directions of travel when energized; selector switch means having several operative positions; said selector switch means having two relatively stationary contacts in one of said positions, and having a relatively movable contact simultaneously engageable with both of said relatively stationary contacts; independent electrical connections between said two relatively stationary contacts and said direction signal devices respectively; auxiliary switch means having open and closed positions; means for biasing said auxiliary switch means to open position; means for causing closure of said auxiliary switch means by operation of the brake control means of the vehicle; said auxiliary switch means being interposed in said independent connections; said selector switch means having relatively stationary contacts in each of a second and third position; and electrical connections between said second and third position relatively stationary contacts and said direction signal devices respectively, by-passing said auxiliary switch means.

3. A combined direction and stop signal system for automotive vehicles, comprising: a pair of electroresponsive direction signal devices indicating opposite directions of travel when energized; unitary selector switch means having several operative positions; unitary auxiliary switch means having open and closed positions; means for biasing said unitary auxiliary switch means to open position; means for causing closure of said unitary auxiliary switch means by operation of the brake control means of the vehicle; means, including electrical connections between said unitary selector switch means and said unitary auxiliary switch means and said signal devices, so connected and arranged that when said unitary selector switch is in one position one only of said direction signal devices is energized, and when in a second position the other only of said direction signal devices is energized, irrespective of the position of said unitary auxiliary switch means; and means whereby when said unitary selector switch means is in r third position closure of said unitary auxiliary switch means energizes both of said direction signal devices.

4. A signal system for automotive vehicles, comprising: a plurality of electroresponsive signal devices; selector switch means, including movable selector contact means, having several operative positions, and relatively stationary contact means cooperable with said selector contact means; auxiliary switch means, including auxiliary relatively stationary contact means and movable auxiliary contact means, cooperable with said auxiliary relatively stationary contact means; and means, including electrical connections, so constructed and arranged that when said selector switch means is in one of said positions, said auxiliary switch means and said selector switch means jointly control energization of said signal devices, and when said selector switch means is in others of said positions said selector switch means controls energization of said signal devices to the exclusion of said auxiliary switch means.

5. A signal system for automotive vehicles, comprising; a plurality of electroresponsive signal devices; selector switch means, including movable selector contact means, having several operative positions, and relatively stationary contact means cooperable with said selector contact means; auxiliary switch means, including auxiliary relatively stationary contact means and movable auxiliary contact means; means for biasing said movable auxiliary contact means out of engagement with said auxiliary relatively stationary contact means; means for moving said auxiliary movable contact means into engagement with said auxiliary relatively stationary contact means by operation of the brake control means of the vehicle; and means, including electrical connections, so constructed and arranged that when said selector switch means is in one of said positions, said auxiliary switch means and said selector switch means jointly control energization of said signal devices, and when said selector switch means is in others of said positions said selector switch means controls energization of said signal devices to the exclusion of said auxiliary switch means.

6. A combination direction and stop signal system for automotive vehicles, comprising: a pair of electroresponsive direction signal devices indicating opposite directions of travel when energized; selector switch means, including movable selector contact means, having several operative positions, and relatively stationary contact means cooperable with said selector contact means; auxiliary switch means, including auxiliary relatively stationary contact means and movable auxiliary contact means, cooperable with said auxiliary relatively stationary contact means; and means whereby when said selector switch means is in one of said positions one only of said direction signal devices is energized, and when in a second position the other only of said direction s'gnal devices is energized, irrespective of the position of said auxiliary switch means; and means whereby when said selector switch means is in a third position closure of said auxiliary switch means energizes both of said direction signal devices.

HARRY A. DOUGLAS.